US008790053B2

(12) United States Patent
Makiyama et al.

(10) Patent No.: US 8,790,053 B2
(45) Date of Patent: Jul. 29, 2014

(54) CUTTING LIQUID SUPPLY DEVICE FOR MACHINE TOOL

(75) Inventors: Tadashi Makiyama, Onomichi (JP); Atsushi Maeda, Okazaki (JP); Shinya Takeda, Fukuyama (JP); Takuya Kawamoto, Fukuyama (JP); Kunihiro Ikeda, Fukuyama (JP); Sadaharu Kittaka, Fukuyama (JP)

(73) Assignee: Horkos Corp (JP)

( * ) Notice: Subject to any disclaimer, the term of this patent is extended or adjusted under 35 U.S.C. 154(b) by 498 days.

(21) Appl. No.: 13/322,433

(22) PCT Filed: Apr. 9, 2010

(86) PCT No.: PCT/JP2010/056414
§ 371 (c)(1),
(2), (4) Date: Nov. 23, 2011

(87) PCT Pub. No.: WO2010/137409
PCT Pub. Date: Dec. 2, 2010

(65) Prior Publication Data
US 2012/0080098 A1 Apr. 5, 2012

(30) Foreign Application Priority Data
May 27, 2009 (JP) ................................. 2009-127234

(51) Int. Cl.
*B23Q 11/10* (2006.01)
*B23B 51/06* (2006.01)
*B24C 1/04* (2006.01)

(52) U.S. Cl.
CPC ............. *B24C 1/045* (2013.01); *B23Q 11/10* (2013.01); *B23Q 11/103* (2013.01); *B23Q 11/1046* (2013.01)
USPC .................................. 409/136; 408/8; 408/56

(58) Field of Classification Search
CPC ............. B23Q 11/1015; B23Q 11/103; B23Q 11/1038; B23B 11/1046
USPC ............... 408/56, 57, 59, 58, 8; 409/135, 136
See application file for complete search history.

(56) References Cited

U.S. PATENT DOCUMENTS 2,946,244 A * 7/1960 Maynard ...................... 408/1 R
5,676,506 A * 10/1997 Sugata .......................... 409/136
(Continued)

FOREIGN PATENT DOCUMENTS

JP 4-189445 7/1992
JP 6-201094 7/1994
(Continued)

*Primary Examiner* — Eric A Gates
*Assistant Examiner* — Paul M Janeski
(74) *Attorney, Agent, or Firm* — Merek, Blackmon & Voorhees, LLC

(57) ABSTRACT

A cutting liquid supply device in a machine tool is configured to remove gas mixed in a cutting liquid supply line to improve the response of discharging a mist of cutting liquid. Cutting liquid is supplied from a pump (42) through a rotary joint (28) to a mist generation device (24) within a rotating spindle (29). The pressure of the cutting liquid is measured by a pressure sensor (47). An air vent device (30) for opening and closing, with respect to atmospheric pressure, piping (3) that supplies the cutting liquid is provided above the rotary joint (28). A detection signal is inputted in the control board (70) from the pressure sensor (47), and when the control board (70) detects, after the pump (42) stops the supply of the cutting liquid to the piping (3), that the pressure of the cutting liquid does not decrease to a level lower than a predetermined threshold value, the control board (70) instructs the air vent device (30) to open the piping (4) to the atmosphere.

4 Claims, 4 Drawing Sheets

(56) References Cited

U.S. PATENT DOCUMENTS

| | | | |
|---|---|---|---|
| 5,951,216 A * | 9/1999 | Antoun | 408/56 |
| 5,967,716 A * | 10/1999 | Katsuzawa et al. | 409/134 |
| 6,602,031 B2 * | 8/2003 | Hara | 409/131 |
| 6,702,199 B1 * | 3/2004 | Sugata et al. | 239/128 |
| 6,773,212 B2 * | 8/2004 | Inoue | 409/136 |
| 6,783,309 B2 * | 8/2004 | Makiyama | 409/136 |
| 7,293,943 B1 * | 11/2007 | Matsumura et al. | 409/136 |
| 7,493,988 B2 * | 2/2009 | Urban et al. | 184/6.14 |
| 7,874,772 B2 * | 1/2011 | Ikuta et al. | 409/135 |
| 8,568,198 B2 * | 10/2013 | Leishman et al. | 451/5 |
| 2004/0079207 A1 * | 4/2004 | Matsumura et al. | 82/158 |
| 2011/0222976 A1 * | 9/2011 | Uchiuzo et al. | 408/59 |

FOREIGN PATENT DOCUMENTS

| | | |
|---|---|---|
| JP | 3087119 | 7/2000 |
| JP | 2000-301428 | 10/2000 |
| JP | 2003-071681 | 3/2003 |
| JP | 2005-177909 | 7/2005 |
| JP | 2005-271177 | 10/2005 |
| JP | 2007-331042 | 12/2007 |

* cited by examiner

CUTTING LIQUID SUPPLY DEVICE FOR MACHINE TOOL

CROSS-REFERENCE TO RELATED APPLICATION

The present application claims the priority under 35 U.S.C. 119 of Japanese Application No. 2009-127234, filed May 27, 2009, which is hereby incorporated herein by reference in its entirety.

TECHNICAL FIELD

The invention relates to a cutting liquid supply device for a machine tool.

BACKGROUND ART

A machine tool discharging cutting liquid as a mist from a tip of a spindle is known as a machine tool reducing usage of cutting liquid to protect the environment. This machine tool discharges the cutting liquid from a tip of a tool as a mist while cutting work. However, when the spouting of the cutting liquid is late, burn-in or damage is caused. Therefore, a response to a mist spouting has been studied.

For example, a machine tool disclosed in Japanese Patent No. 3087119 prevents leaking by sucking a fixed amount of cutting liquid in a cutting liquid supply line when a pump is stopped from supplying the cutting liquid. In this machine tool, late response is prevented by returning the cutting liquid sucked at the start of supply to the cutting liquid supply line again.

Japanese Unexamined Patent Application Publication No. 6-201094 discloses a machine tool not discharging a mist but detecting with a monitoring device the pressure provided to piping in which lubricant is fed from a pump. In this machine tool, a bearing is prevented from burning by displaying a piping leak when the pressure is lower than a minimum alarm pressure.

SUMMARY OF THE INVENTION

Problems to be Solved by the Invention

A pump supplies a minute quantity of cutting liquid of 10 µl/s (micro liters/second). On the other hand, the quantity of cutting liquid in the path length of the supply line increases in proportion to the path length. Gas mixed in the cutting liquid takes up a micro supply capacity of the pump, thereby reducing the response of discharging a mist of the cutting liquid after starting the pump. The pump uptime corresponds to the spindle machining time, and therefore the pump often repeats a stop and start every 5 to 10 seconds. Accordingly, the late supplying of the mist influences the quality of a product comprising the machined object.

When there is a leak in the cutting liquid supply line, pressure increase is delayed. The inventors have studied and checked that the response until discharging the mist might become bad.

In a machine tool in which the mist spouts from the tip of the spindle, the cutting liquid is introduced into the spindle from a rotary joint behind the spindle. In case the spindle is arranged in a horizontal direction, the rotary joint is roughly at the same horizontal level as the cutting liquid supply pump. On the other hand, in case the spindle is arranged in a vertical direction, the rotary joint is located at a higher position behind the spindle, so that a high place is formed in the cutting liquid supply line.

In a process studying a cause to the bad response, it has been recognized that the gas mixed in the cutting liquid supply line gathers in the high place in the cutting liquid supply line, if there is a high place in the course of the cutting liquid supply line.

An object of the present invention is to remove the gas mixed in the cutting liquid supply line and to improve the response for discharging the mist.

Means of Solving the Problems

A cutting liquid supply device of the present invention, in a machine tool including a supply line to supply cutting liquid from a pump to a mist generation device in a rotating spindle through a rotary joint, includes a pressure sensor to measure a pressure of the cutting liquid supplied from the pump, an air vent device to open and close the supply line to atmospheric pressure, and a control board. The air vent device is provided at a position above the rotary joint in the supply line. After a detection signal is inputted to the control board from the pressure sensor, and the pump is stopped from supplying the cutting liquid to the cutting liquid supply line, the control board instructs the air vent device to open the cutting liquid supply line to the atmospheric pressure when it is detected that the pressure of the cutting liquid does not decrease to a level lower than a predetermined threshold value.

Figure 1:
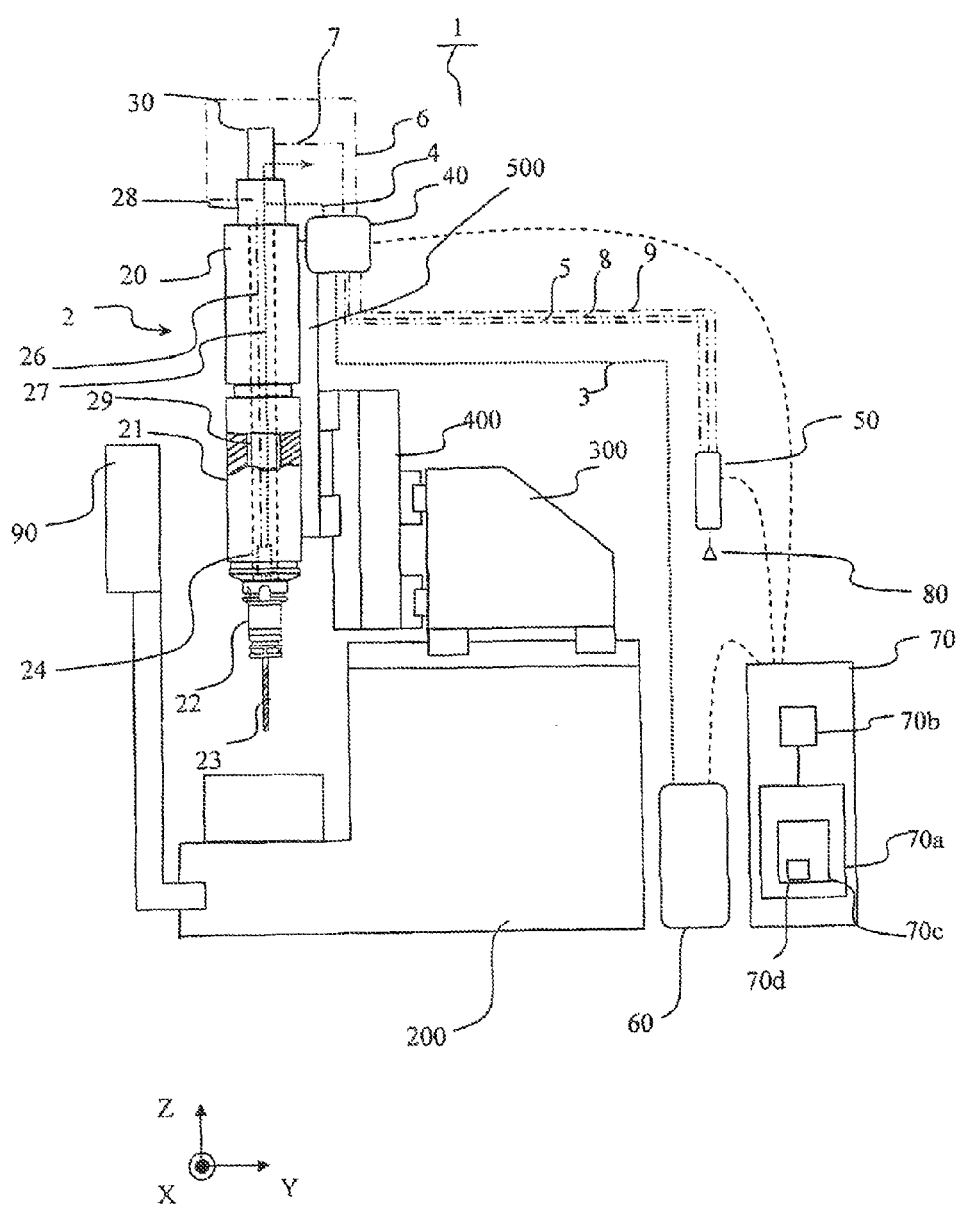
FIG. 1 illustrates a machine tool 1 according to an embodiment of the present invention.

DESCRIPTION OF THE REFERENCE NUMERAL 1 machine tool
2 spindle unit
24 mist generation device
26 compressed air supply passage
27 cutting liquid supply passage
28 rotary joint
30 air vent device
40 supply control device
42 pump
50 gas supply device
60 tank
70 control board
90 operation panel

DETAILED DESCRIPTION OF THE PREFERRED EMBODIMENT

FIG. 1 illustrates a machine tool 1 according to an embodiment of the present invention. In the following descriptions, a three-dimensional coordinate system of XYZ assumes that an X direction, a Y direction and a Z direction are respectively a lateral direction, a longitudinal direction and a vertical direction. As shown in FIG. 1, the machine tool 1 of the present invention includes a base 200, a Y slide 300 that slides in the Y direction on the base 200, an X slide 400 that slides in the X direction on the Y slide 300, a Z slide 500 that slides in the Z direction on the X slide 400, and a spindle unit 2 that is loaded on the Z slide 500. This machine tool 1 is known as a vertical machine tool. The stacking of the Y slide 300, the X slide 400 and the Z slide 500 on the base 200 may be in any order. The spindle unit 2 includes a spindle motor 20, a spindle 21 having a mist generation device 24, and a holder 22 to hold a tool 23. A rotating spindle 29 from the spindle motor 20 to the spindle 21 and the bottom holder 22 extends in the vertical direction and includes a cutting liquid supply passage 27 and a compressed air supply passage 26 in the spindle.

The machine tool 1 further includes a gas supply device 50 to receive compressed air from a compressed air source 80, a cutting liquid tank 60, a supply control device 40 provided on the Z slide, a control board 70 and an operation panel 90. A rotary joint 28 to communicate the cutting liquid supply passage 27 to the compressed air supply passage 26 in the rotating spindle 29 is provided on the spindle motor 20. A cutting liquid supply line includes piping 3 from the tank 60 to the supply control device 40, piping 4 from the supply control device 40 to the rotary joint 28, and the cutting liquid supply passage 27 in the rotating spindle.

The machine tool 1 is called a vertical machine tool because the rotating spindle 29 of the spindle unit 2 extends in the downward Z direction. The rotary joint 28 is located on the top of the spindle unit 2, the highest part of the machine tool 1. An air vent device 30 is provided above the rotary joint 28, which is the highest point of the cutting liquid supply line.

The control board 70 controls the gas supply device 50 and the supply control device 40 according to detection signals from a level gauge 61 and a pressure sensor 47 that are mentioned later in FIG. 2. In addition, the control board 70 displays detections on the operation panel 90 and receives instructions from the operator. These controls are operated by running a program 70c, which is stored in a memory unit 70a in the control board 70, with a processing unit 70b.

Figure 2:
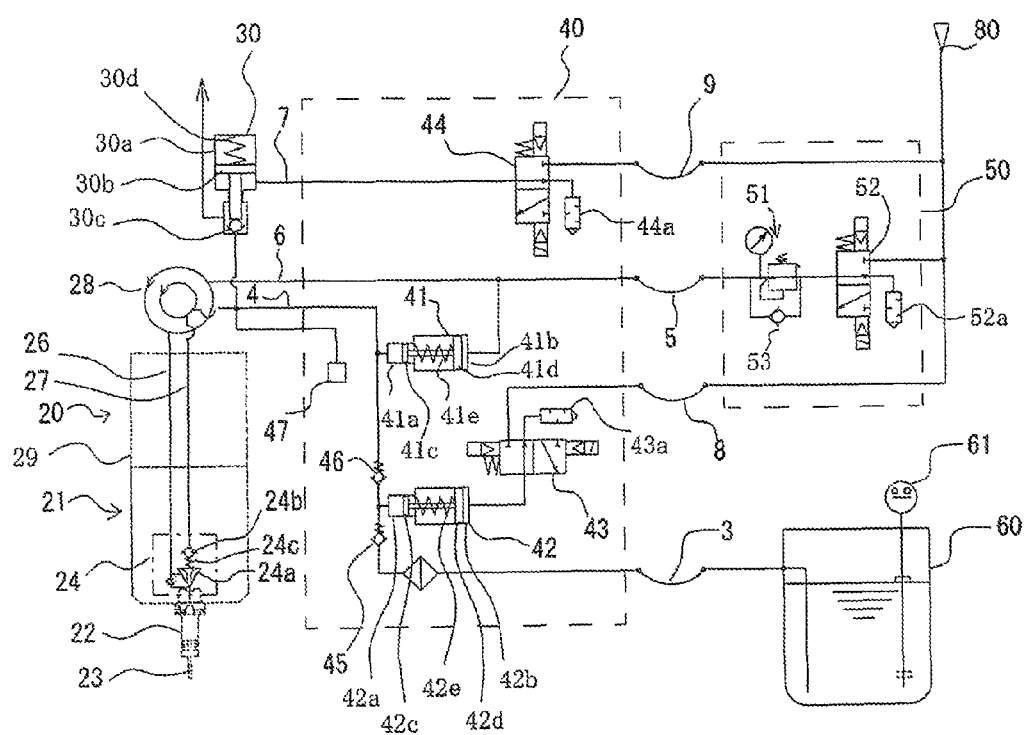
FIG. 2 illustrates pipe lines of the machine tool 1.

FIG. 2 illustrates a piping system of the machine tool 1. The mist generation device 24 to make the cutting liquid into a mist through the use of compressed air is placed in the spindle 21. The mist generation device 24 includes a nozzle 24a, a ball 24b and a compressed spring 24c.

The nozzle 24a is provided at the tip of the cutting liquid supply passage 27 that passes from the rotary joint 28 and through the rotating spindle 29 to introduce the compressed air in the compressed air supply passage 26 from the side face. In addition, the ball 24b is located at the center and urged by the compressed spring 24c toward the cutting liquid supply passage 27 to close the cutting liquid supply passage 27. When the cutting liquid in the cutting liquid supply passage 27 becomes equal to or greater than a predetermined pressure, the ball 24b is displaced downwardly against the elasticity of the compressed spring 24c to open the cutting liquid supply passage 27. Conversely, when the cutting liquid in the cutting liquid supply passage 27 becomes equal to or less than a predetermined pressure, the ball 24b is displaced upwardly by the elasticity of the compressed spring 24c to close the cutting liquid supply passage 27. The compressed air is supplied to the tip of the nozzle 24a by the compressed air supply passage 26, and the cutting liquid, which is strongly stirred by the compressed air, is discharged as a mist from the tip of the tool 23 via center holes of the holder 22 and the tool 23.

The air vent device 30 includes a piston 30b in a cylinder chamber 30a and blocks the piping 4 for the cutting liquid with the compressed spring 30d through the ball 30c. When the compressed air flows into the cylinder chamber 30a, the piston 30b is displaced upwardly against the compressed spring 30d to place the piping 4 at atmospheric pressure.

The supply control device 40 includes a pump 42, a suction discharge device 41 and a pressure sensor 47. The pressure sensor 47 measures the pressure of the piping 4 between the supply control device 40 and the rotary joint 28 and sends it to the control board 70 shown in FIG. 1.

The pump 42 includes a cylinder chamber 42a for cutting liquid and a cylinder chamber 42b for compressed air in an opposed state. Connected pistons 42c and 42d are respectively provided in the cylinder chambers 42a and 42b. The pistons 42c and 42d are always urged in one direction by the compressed spring 42e. The pump 42 has check valves 45 and 46 provided at the inflow side and the discharge side, respectively. A directional valve 43 intermittently feeds the compressed air to the pump 42 to drive the pump 42. When the compressed air is provided to the cylinder chamber 42b of the pump 42, the cutting liquid is transferred by the piston 42c and, when the compressed air is stopped, the piston 42d is returned by the compressed spring 42e in the pump to remove the gas in the piston chamber 42b. The removed gas is discharged to the atmosphere through the directional valve 43 and a silencer 43a.

The suction discharge device 41 includes a cylinder chamber 41a for cutting liquid and a cylinder chamber 41b for compressed air in an opposed state. Connected pistons 41c and 41d are respectively provided in the cylinder chambers 41a and 41b. The pistons 41c and 41d are always urged in one direction by a compressed spring 41e.

The directional valve 44, which feeds the compressed air to the air vent device 30, discharges the gas in the piston chamber 30a of the air vent device 30 to the atmosphere through a silencer 44a when the compressed air is stopped.

The gas supply device 50 includes a pressure regulating valve 51 to control the supply pressure of the compressed air, a directional valve 52, and a check valve 53 to permit the compressed air in the compressed air supply line to flow through the directional valve side. The directional valve 52 includes a silencer 52a to receive the compressed air from compressed air supply piping 5 and to discharge the compressed air in the piping 5 to the atmosphere. The pipings 9 and 8 directly convey the compressed air from the compressed air supply 80 to the directional valves 44 and 43, respectively.

The above-mentioned directional valves 44, 52 and 43, which receive the compressed air from the same compressed air source 80, are controlled with the control board 70 shown in FIG. 1. Though the control board 70 is transferred to the state of "pump-ON" during cutting with the tool 23, the directional valve 43 is controlled so as to intermittently provide the compressed air to the pump in the state of "pump-ON". In the state of "pump-OFF", movements to intermittently provide the compressed air to the pump are stopped.

The cutting liquid tank 60 has a level gauge 61 to measure the liquid level of the stored cutting liquid. The detected liquid level is transmitted to the control board 70 of FIG. 1.

The machine tool 1 is operated as follows. When the directional valve 52 is switched to the compressed air supply side, the compressed air is provided to the mist generation device 24 through the rotary joint 28 and the compressed air supply passage 26 of the rotating spindle 29. The compressed air flows into the cylinder chamber 41b of the suction discharge device 41, pressing and displacing the piston 41d toward the side of the other piston 41c against the elasticity of the compressed spring 41e. Accordingly, the capacity of the cylinder chamber 41a of the cutting liquid side is minimized.

The directional valve 43 is repeatedly reciprocated and displaced between the compressed air supply side and the compressed air outflow side. When the directional valve 43 is located at the compressed air supply side, the piston 42d is pressed toward the side of the other piston 42c against the elasticity of the compressed spring 42e, because the compressed air is supplied into the cylinder chamber 42b. On the other hand, when the directional valve 43 is located at the compressed air outflow side, the piston 42b is displaced by the elasticity of the compressed spring 42e, because the compressed air in the cylinder chamber 42b flows out of the directional valve 43. The piston 42c of the cylinder chamber 42a is displaced whenever the above-mentioned operations are repeated, and therefore, the cylinder chamber 42a repeatedly sucks the cutting liquid in the cutting liquid tank 60 and discharges it. This is the state of "pump-ON".

The cutting liquid discharged in this way reaches the mist generation device 24 through the rotary joint 28 and the cutting liquid supply passage 27. The ball 24b is pushed downwardly by the pressure of the cutting liquid against the urging of the compressed spring 24c, and the cutting liquid supply passage 27 is open. Accordingly, the cutting liquid is made into a mist by mixing and stirring with the compressed air to flow out from the tip opening of the tool 22 to the outside through the center hole.

When the supply of compressed air is stopped by displacing the directional valve 52 to the compressed air outflow side, the supply of the compressed air to the mist generation device 24 is stopped, the operation of the pump 42 is also stopped, and the supply of the cutting liquid into the cutting liquid supply line is stopped.

In the suction discharge device 41, the cutting liquid in the piping 4 is sucked by displacing the piston 41c by the elasticity of the compressed spring 41e, because the compressed air in the cylinder chamber 41b flows out of the directional valve 52. This operation prevents leaking of the cutting liquid in the cutting liquid supply passage 27 from the tool 23.

When the directional valve 52 is again displaced to the side for supplying the compressed air under the condition where the supply of the compressed air is stopped, the compressed air is supplied to the mist generation device 24 through the piping 5 like the above. The supplied compressed air is supplied into the cylinder chamber 41b of the suction discharge device 41, where it displaces the piston 41d with a pressing force to the side of the other piston 41c against the elasticity of the compressed spring 41e. The pressing displacement forces out the cutting liquid remaining in the cylinder chamber 41a, and the forced cutting liquid is supplied into the cutting liquid supply line.

Figure 3:
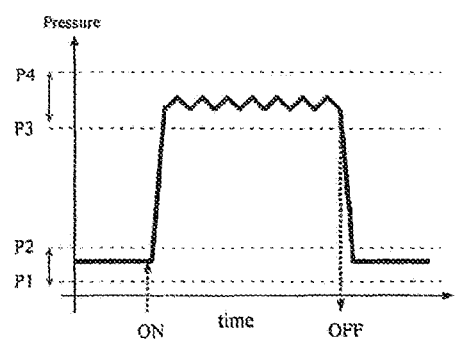
FIG. 3 illustrates pressure in a cutting liquid supply line.
Figure 3:
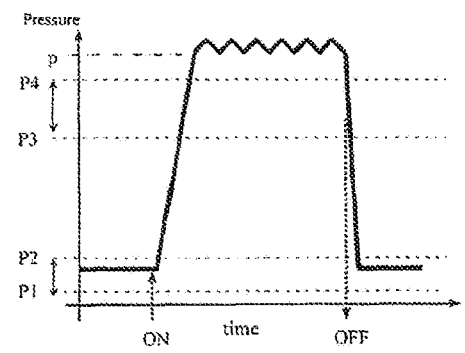
Figure 3:
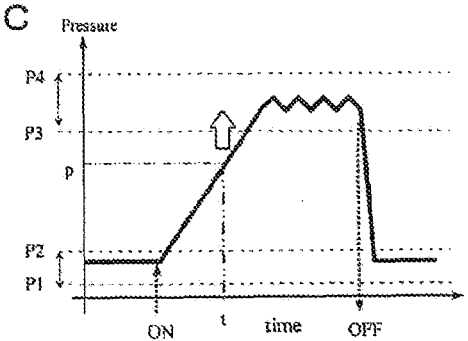
Figure 3:
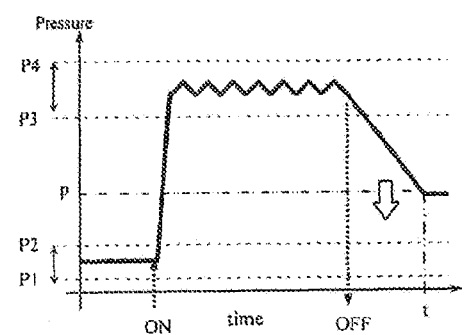
Figure 3:
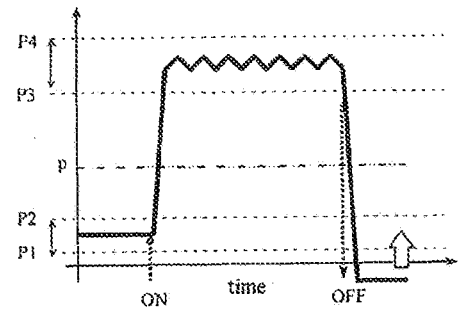

Abnormal functioning in the cutting liquid supply line of the machine tool 1 will be explained with reference to FIG. 3. In addition, FIG. 3A illustrates a normal waveform detected by the pressure sensor 47. This indicates the state in which the pressure which, at the time when the pump 42 is turned OFF, is within the normal pressure from P1 to P2, sharply increases when the pump is turned ON, reaches the normal pressure from P3 to P4 when the pump 42 is turned ON, forms a pulsating current shaped pressure waveform when the pump 42 is intermittently driven, and sharply decreases to the normal pressure when the pump 42 is turned OFF.

The abnormal functioning to be detected by the pressure sensor 47 can be classified roughly into the following four types.

1. The state in which the pressure is too high after the pump is turned ON (FIG. 3B).
It is the state in which the pressure increases beyond the limits of the normal pressure from P3 to P4 after driving the pump 42 in the state of the pump-ON.

2. A delay in the pressure increasing at the time the pump is turned ON (FIG. 3C).
It takes more time than normal until the pressure reaches the normal pressure from P3 to P4 after the pump 42 is driven in the state of the pump-ON.

3. A delay in the pressure decreasing at the time the pump is turned OFF (FIG. 3D).
It takes more time than normal until the pressure reaches the normal pressure from P1 to P2 after the pump 42 is turned off.

4. The state in which the pressure is too low after the pump is turned OFF (FIG. 3E).
It is the state in which the pressure decreases beyond the limits of the normal pressure from P1 to P2 after the pump 42 is turned off.

Though these abnormal states are not preceded by specific distinct causes, respectively, the causes can be expected.

In the above-mentioned abnormal functioning type 1, a case in which the pump 42 discharges a great deal of cutting fluid because of the compressed air pressure too high and a case in which the cutting liquid supply line is clogged are assumed.

In the above-mentioned abnormal functioning type 2, a case in which air enters the cutting liquid supply line, a case in which a leak occurs in the cutting liquid supply line, a case in which the cutting liquid supply passage 27 is out of order, and a case in which a leak occurs in the rotary joint 28 are assumed.

In the above-mentioned abnormal functioning type 3, a case in which air enters the cutting liquid supply line is assumed.

In the above-mentioned abnormal functioning type 4, a case in which a leak occurs in the cutting liquid supply line and a case in which poor discharge occurs in the pump 42 are assumed.

The memory unit 70a of the control board 70 has a monitoring program 70d that notifies the operator by displaying warnings on the operation panel 90 and monitors and deals with the abnormal states.

Figure 4:
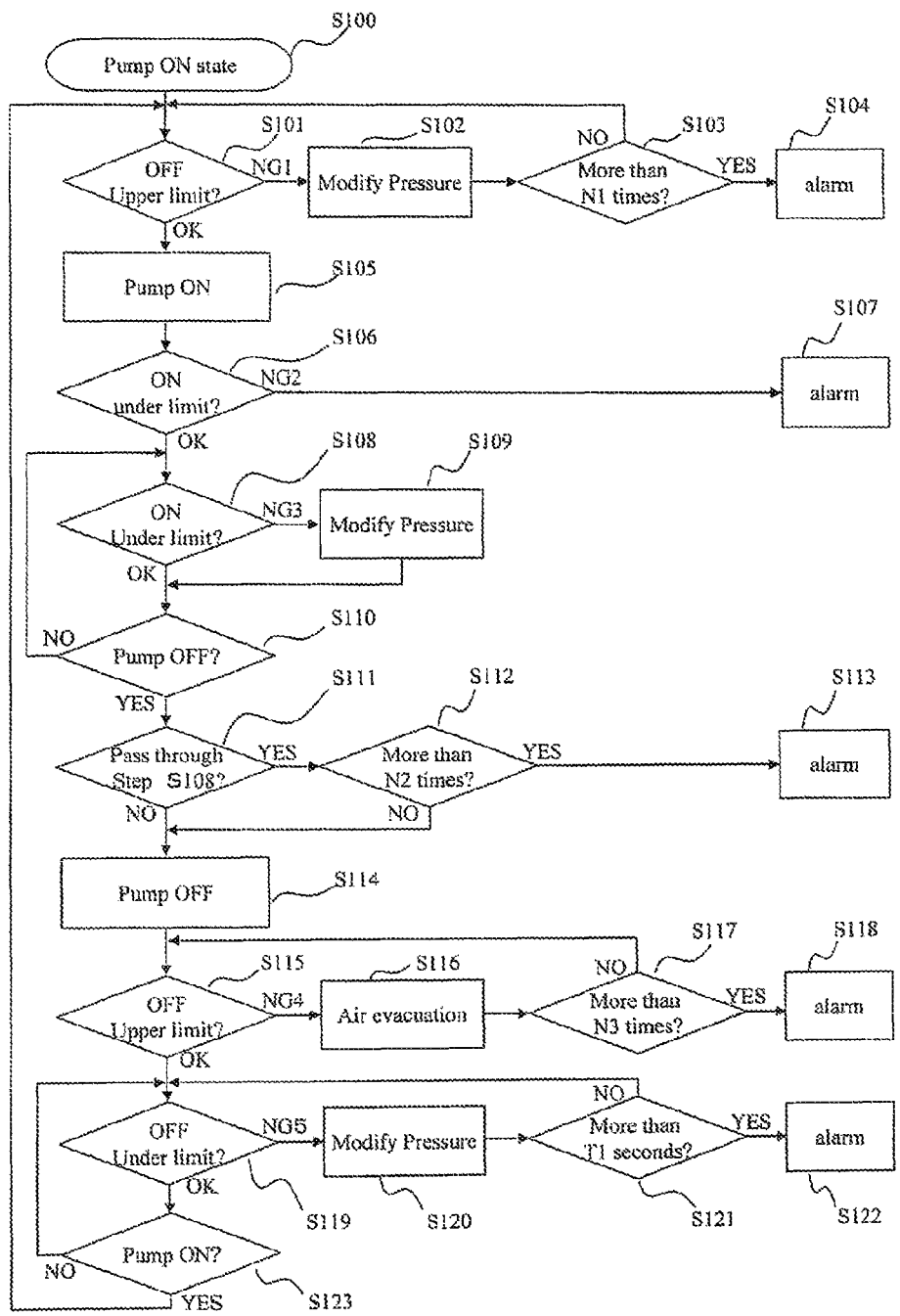
FIG. 4 illustrates the flow of a monitor program 70d.

Hereinafter, the monitoring program 70d will be explained with reference to FIG. 4. The monitoring program 70d is started when the control board 70 is in the state of pump-ON (S100).

In a step S101, the pressure of the cutting liquid before the pump 42 discharges is measured by the pressure sensor 47, and whether or not the pressure exceeds an upper threshold value P2 is monitored. If the pressure exceeds the upper threshold value P2, a flag NG1 is displayed to indicate abnormal functioning. If the pressure does not exceed it, the cutting liquid is discharged from the pump 42 by providing the compressed air to the pump 42 in a step S105. In a step S106, whether or not the pressure exceeds an upper threshold value P4 a predetermined time after the pressure sensor 47 is turned ON, is monitored. If the pressure exceeds the upper threshold value P4, the flag NG2 is displayed to indicate abnormal functioning. If the pressure does not exceed the upper threshold pressure P4, in a next step S108, whether or not the pressure is below a lower threshold value P3 when the pressure sensor 47 is turned ON is monitored. If the pressure is below the lower threshold value P3, the flag NG3 is displayed.

If the pressure is not below the lower threshold pressure P3, in a next step S110, whether or not the control board 70 transits to the state of "pump-OFF" is monitored, and the operation returns to the step S108 unless the control board 70 is in the state of "pump-OFF".

When transiting to the state of "pump-OFF", whether or not the step S108 has ever passed through the state of OK in a step S111. If even once passed, the pump 42 is stopped in a step S114.

In a step S115, the pressure after the predetermined time progress after the pump-OFF is measured by the pressure sensor 47, and whether or not the pressure exceeds the upper threshold value P2 is monitored. If the pressure exceeds the upper threshold value P2, the flag NG4 is displayed to indicate abnormal functioning. If the pressure does not exceed the upper threshold pressure P2, whether or not the pressure is below the lower threshold value P1 is monitored in a step S119. If the pressure is below the lower threshold value P1, the flag NG5 is displayed to indicate abnormal functioning. If the pressure is not below the lower threshold value P1, the step S119 is repeated until transiting to the "pump-ON" again in a step S123.

The flags NG1 to NG5 are memorized in the memory unit 70a of the control board 70. In the steps of the monitoring program 70d, the correspondences and the warnings in cases in which the flags NG1 to NG5 are displayed is explained hereinafter.

If the flag NG1 is displayed in the step S101, the air vent device 30 works for a predetermined time in the step S102, and the pressure in the cutting liquid supply line is detected again in the step S101. A step S103 shifts to a step S104 when the step S101 and the step S102 are repeated five times, and the machine tool 1 is stopped with the warning "Air removal alarm" on the operation panel 90.

When the flag NG2 is displayed in the step S106, the machine tool 1 is stopped with a warning "On-high alarm" on the operation panel 90. On the basis of the warning, the operator checks whether the cutting liquid supply line is clogged, and restarts the machine tool under the condition that the pressure of the compressed air is reduced.

When the flag NG3 is displayed in the step S108, the pump 42 has its drive cycle advanced and its discharge quantity increased in the step S109. According to this action, the pressure of the cutting liquid is restored. However, when the flag NG3 is repeatedly encountered many times in the step S112, the machine tool 1 is stopped with the warning "On-low alarm" on the operation panel 90 in the step S113. The operator manually operates the air vent device 30 on the basis of the warning or checks the discharge quantity of the pump 42.

When the flag NG4 is displayed in the step S115, the air vent device 30 performs air venting in a step S116. In a step S117, it is repeatedly checked whether or not air venting is carried out a predetermined number of times, and if the air venting is carried out the predetermined number of times, the machine tool is stopped with warning "OFF-high alarm" on the operation panel 90 in a step S118. The operator manually operates the air vent device 30 based on the warning.

When the flag NG5 is displayed in a step S119, the pump 42 is operated until the pressure reaches the lower threshold value P1 in a step S120. If it is judged that the pressure reaches the lower threshold value P1 more than T1 seconds after the start of operation of the pump 42 in the step S121, the machine tool 1 is stopped with the warning "OFF-low alarm" on the operation panel 90 in a step S122. The operator checks the discharge quantity of the pump or leakage from the cutting liquid supply line.

As mentioned above, the monitoring program 70d stops the machine tool 1 when several iterations of restoring operation are automatically detected as shown in the steps S103, S112 and S117, or when the predetermined time passes after automatically detecting a restoration, as shown in the step S121.

In this example, in case the pressure is below the lower threshold value P3 at the time of "pump-ON", and abnormal functioning is detected in the response at the beginning of mist spouting ("ON-low alarm"), the discharge quantity of the pump 42 is increased, because it is not assumed only that air is in the cutting liquid supply line (the step S109). On the other hand, in case the abnormal functioning is that the pressure does not decrease to the level lower than the lower threshold value P2 at the time "pump-OFF" is detected ("OFF-high alarm"), the air vent device 30 is driven because the abnormal functioning itself does not cause poor cutting (the step S116). In the case of "OFF-high alarm", air is almost certainly in the cutting liquid supply line. Therefore, in most cases, according to this operation, the response of the mist spouting at the next occurrence of "pump-ON" can be restored.

In the above-mentioned example, the number (N) of alarm judgments and the time (T) can be determined from ranges of possible values. A valve pump, a gear pump, a piston pump, a screw pump, or the like may be used as the pump 42. Though the air vent device 30 is placed at the high point in the cutting liquid supply line, it is effective if it is placed at the high point between the pump 42 and the rotary joint 28 and higher than the rotary joint 28.

The invention claimed is:

1. A cutting liquid supply device in a machine tool comprising a supply line to supply a cutting liquid from a pump to a mist generation device through a rotary joint, the cutting liquid supply device comprising:
    a pressure sensor to measure a pressure of cutting liquid that is supplied from the pump;
    an air vent device to open and close the supply line to atmospheric pressure, the air vent device being provided at a position in the supply line higher than the rotary joint; and
    a control board to direct the air vent device to open the cutting liquid to the atmospheric pressure upon detection of the pressure of the cutting liquid inputted from the pressure sensor not decreasing to a level lower than a predetermined threshold value after the pump stops supplying the cutting liquid to the cutting liquid supply line.

2. A cutting liquid supply device in a machine tool according to claim 1, wherein the machine tool includes a rotating spindle in a vertical direction, a holder with a tool below the rotating spindle, and the rotary joint positioned above the rotating spindle, and wherein the air vent device is above the rotary joint.

3. A cutting liquid supply device in a machine tool according to claim 1,
    wherein the machine tool further comprises an operation panel, and
    wherein the control board has a warning displayed on the operation panel when the pressure of the cutting liquid does not continuously decrease to the level lower than the predetermined threshold value when the pump repeatedly supplies and stops supplying the cutting liquid.

4. A cutting liquid supply device in a machine tool according to claim 1,
    wherein the control board directs the pump to increase the discharge quantity of the cutting liquid when the pressure sensor detects that the pressure of the cutting liquid does not reach the predetermined threshold value after the pump start supplying the cutting liquid to the cutting liquid supply line.

\* \* \* \* \*